(12) United States Patent
Sgarbi et al.

(10) Patent No.: US 6,286,323 B1
(45) Date of Patent: Sep. 11, 2001

(54) AIR CONDITIONING AND REFRIGERATION SYSTEM USING A SULFONATE CONTAINING CALCIUM SALT OF DIALKYL AROMATIC SULFONIC ACID AND NONYLATED PHENYLAMINE DERIVATIVES IN A POLAR COMPOUND

(75) Inventors: Tony Pio Sgarbi, Houston, TX (US); Teresa Leigh Barr, Port Townsend, WA (US)

(73) Assignee: Antonio Pio Sgarbi, Houston, TX (US)

(*) Notice: Subject to any disclaimer, the term of this patent is extended or adjusted under 35 U.S.C. 154(b) by 0 days.

(21) Appl. No.: 09/562,573

(22) Filed: May 2, 2000

(51) Int. Cl.[7] ..................................................... F25B 41/00
(52) U.S. Cl. ............................................................. 62/114
(58) Field of Search ................................ 62/114; 252/68

(56) References Cited

U.S. PATENT DOCUMENTS

| | | | |
|---|---|---|---|
| 4,963,280 | * 10/1990 | Wilkins et al. | 252/68 |
| 4,963,282 | * 10/1990 | Jolley et al. | 252/67 |
| 5,445,749 | * 8/1995 | Hong | 252/33.6 |
| 5,744,053 | * 4/1998 | Kaimai | 252/68 |
| 5,826,436 | * 10/1998 | Scaringe et al. | 62/114 |
| 5,858,266 | * 1/1999 | Kaneko | 252/68 |

* cited by examiner

Primary Examiner—William Doerrler
Assistant Examiner—Malik N. Drake
(74) Attorney, Agent, or Firm—Wendy K. Busko; Buskop Law Group, P.

(57) ABSTRACT

A method of improving the efficiency of an air conditioning and refrigeration system, comprising introducing into the system a mixture of a carrier with an energy transferring polar compound comprising a sulfonate containing calcium salt of dialkyl aromatic sulfonic acid and nonylated phenylamine derivatives; and a novel additive containing a polar compound containing a sulfonate containing calcium salt of dialkyl aromatic sulfonic acid and nonylated phenylamine derivatives, and an air conditioning system utilizing the polar compound containing a sulfonate containing calcium salt of dialkyl aromatic sulfonic acid and nonylated phenylamine derivatives.

15 Claims, 1 Drawing Sheet

Laminar Flow After Introduction of Invention = Better heat transfer

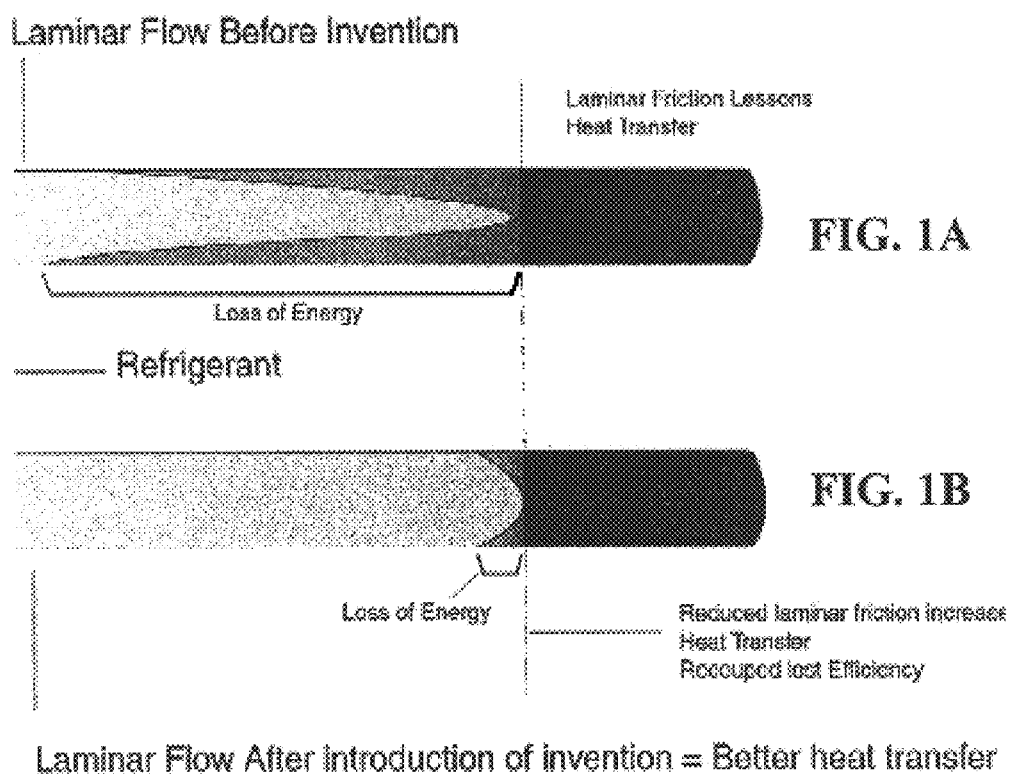

AIR CONDITIONING AND REFRIGERATION SYSTEM USING A SULFONATE CONTAINING CALCIUM SALT OF DIALKYL AROMATIC SULFONIC ACID AND NONYLATED PHENYLAMINE DERIVATIVES IN A POLAR COMPOUND

FIELD OF THE INVENTION

The present invention relates to the improvement in the energy efficiency of air conditioning and refrigeration systems including refrigeration units, and air conditioning systems that transfer energy from one location to another.

BACKGROUND OF THE INVENTION

Since the early 1970's there has been a constant effort to improve the energy efficiency of cooling units which function on the air conditioning and refrigeration principle. As is well known, air conditioning and refrigeration systems function by relying upon the energy absorbed or released as a compressible fluid undergoes either pressure increase in a compressor or pressure decrease across a valve or other orifice. Typically, these systems rely upon phase changes from the gas to liquid state as a result of changes in pressure to effectuate energy transport. Such air conditioning and refrigeration units are utilized for large commercial installations either for refrigeration or freezing of perishable articles and the like as well as for climate control of large commercial buildings as well as individual dwellings. The energy efficiency of these units has been greatly increased through redesigned compressors, motors and other mechanical and design improvements. Improved methods for lubricating compressors have been developed so as to reduce the frictional energy which must be overcome in the compressor while new compressor designs have also been developed in an attempt to increase the energy efficiency of the systems.

However, a need still exists for continued energy improvement in the field of air conditioning and refrigeration systems.

SUMMARY OF THE INVENTION

Accordingly, it is an object of the present invention to provide a composition which is capable of greatly increasing the energy efficiency of air conditioning or refrigeration systems using a polar compound containing a sulfonate containing calcium salt of dialkyl aromatic sulfonic acid and nonylated phenylamine derivatives.

A further object of the present invention is to provide a novel polar composition as an additive for lubricants which will be useful in air conditioning units, refrigeration units and engines to improve their energy efficiency. A further object of the present invention is to provide a method for improving the energy efficiency of air conditioning and refrigeration systems using a polar compound containing a sulfonate containing calcium salt of dialkyl aromatic sulfonic acid and nonylated phenylamine derivatives. The sulfonate component is selected so as to remain liquid during all phases of the air conditioning and refrigeration cycles.

Various additional components can be added to the invention including but not limited to: metal conditioners, metal stabilizers, antioxidants, corrosion inhibitors, seal conditioners, tracer dyes, broad spectrum biocides, acid scavengers; water displacement additives or combinations thereof.

BRIEF DESCRIPTION OF THE DRAWINGS

In the detailed description of the preferred embodiments of the invention presented below, reference is made to the accompanying drawings, in which:

FIG. 1A shows the refrigerant flow before the introduction of our technology where the refrigerant (due to laminar friction) does not touch the metal surface and loses energy. The flow is described as a bullet with a sharp point.

FIG. 1B shows the refrigerant flow with the addition of our technology where the molecules have "removed" the oil film buildup and increased the flow rate of the refrigerant. The bullet shaped curve is now almost flat and the contact point of the refrigerant with the metal surface has dramatically increased, thereby accelerating heat transfer and minimizing energy loss.

DESCRIPTION OF THE PREFERRED EMBODIMENTS

Typical air conditioning and refrigeration systems in use today rely upon a compressible fluid to transfer the energy from one location to another. The most common energy transfer media are the members of the ozone friendly compressible refrigerants as well as ammonia. Ammonia finds particular application in large-scale refrigeration systems such as cold storage units and the like. In addition to these two classes of energy transfer media or compressible fluids, other compressible fluids may be utilized which undergo phase changes under reasonable changes of pressure. Such compressible fluids which undergo the necessary change from liquid to gaseous states by the change in pressure are well known in the art and include gases such as carbon dioxide. In general the selection of the energy transfer media is dependent upon a number of design criteria which are well known. In general, for commercial installations the use of either refrigerant or ammonia is most preferred. However in special applications media such as carbon dioxide may be utilized.

The polar organic compound of the present invention contains sufficient polar groups so as to provide regions of the molecule which have high electron densities and other regions which have low electron densities. The particular compound selected must obviously be compatible with the compressible fluid being utilized as the energy transfer media and with the materials of construction of the various components of the energy transfer system. Furthermore, the compounds must remain essentially liquid under the operating conditions encountered. That is, there must be only inconsequential solidification in the cold portion or expansion section of the air conditioning and refrigeration system and only minimal volatilization when exposed to the high temperatures on the high pressure side of the system that is, the polar compound is essentially non-compressible under operating conditions. In addition to being compatible with both the energy transfer medium and the materials of construction of the air conditioning and refrigeration system, polar compound must also be selected to be compatible with the lubricants typically encountered in air conditioning and refrigeration systems. As is well known, all air conditioning and refrigeration systems contain a lubricant which is continuously circulating throughout the system to lubricate the moving parts of the compressor. Typically these lubricants are based upon naphthenic oils. The most common of the lubricants are designated 3GS and 4GS refrigeration oils. Essentially any polar compound meeting the foregoing criteria can be utilized in the practice of the present invention.

The present invention relates to use of polyol ester refrigeration oil as the preferred lubrication for CFC, HCFC and HFC refrigerated applications. The present invention, in a preferred embodiment uses a synthetic hydrocarbon lubricant formulated with polyol ester base stocks and additives which provide lubricity stability and resistance to corrosion. When the novel compound is used in a refrigeration system, the lubricant exhibits the desired miscibility at critical temperatures, a low viscosity loss, as well as stability for long system life in the air conditioning system.

The preferred polar compounds are mineral oil with the additive being a liquid sulfonate containing calcium salt of dialkyl aromatic sulfonic acid and nonylated phenylamine derivatives. With the most preferred group of polar compounds comprising liquid sulfonate containing calcium salt of dialkyl aromatic sulfonic acid and nonylated phenylamine. The liquid sulfonate containing calcium salt of dialkyl aromatic sulfonic acid and nonylated phenylamine are particularly preferred for refrigeration systems being utilized to store foodstuffs because the combination is a high performance result and corrosion inhibitor for ferrous metals, in particular. It is a very effective yellow metal deactivator. Its unique preparation of high performance polar additives capable of forming films or complexes on ferrous and non ferrous metal surfaces, particularly copper and its alloys that might be exposed to solubulized sulfur power or active sulfur containing EP additives. It provides excellent demulsibility to lubricating oils and offers exceptional penetration stability. It is both a non-corrosive and an aminic antioxidant.

The liquid sulfonate containing calcium salt of dialkyl aromatic sulfonic acid and nonylated phenylamine derivatives must, remain liquid throughout the different operating phases of an air conditioning and refrigeration system. While the molecular weight and degree of sulfonate containing calcium salt of dialkyl aromatic sulfonic acid and nonylated phenylamine derivatives in as is not particularly critical, care should be taken not to use materials which contain a high wax content which may solidify in the expansion portion of the air conditioning and refrigeration system. Such waxy materials can build up on valves and other aspects of the system causing malfunction or increase maintenance. Furthermore, the presence of these solid components may impair the achievement of the desired energy improvement. Typically, both the liquid sulfonate containing calcium salt of dialkyl aromatic sulfonic acid and nonylated phenylamine components will contain from about 6 to 24 carbon atoms and from 1 to 10 sulfonate containing calcium salt of dialkyl aromatic sulfonic acid and nonylated phenylamine. The degree of sulfonate containing calcium salt of dialkyl aromatic sulfonic acid and nonylated phenylamine derivatives in a usage and molecular weight determine the relative volatility and solidification points of the compounds. Of the sulfonate containing calcium salt of dialkyl aromatic sulfonic acid and nonylated phenylamine, particularly preferred is a product sold by King Industries, Inc., Science Road, Norwalk Conn., 06852-0588 under the trade name NA-SUL AO-130 which is a diphenylamine derivative. A preferred calcium salt of dialkyl aromatic sulfonic acid is NA-SUL729-NF sold by King Industries, Inc. Science Road, Norwalk Conn., 06852-0588.

The polarity of the molecule is believed to result in the polar compound physically attaching itself to the metal walls of the air conditioning and refrigeration system. The metal surfaces in the air conditioning and refrigeration system are believed to contain a high electron charge such that the present polar molecule will orientate itself towards and form a van der waals force and bond with the metal surface. Without being bound by any particular theory, it is believed that when the polar compound binds to the metal wall that this results in a reduction in the boundary layer phenomenon which is encountered in the transfer of energy from a fluid contained within a tube through the tube wall to the surrounding fluid. This boundary layer phenomenon reduces the energy transfer coefficient thereby decreasing efficiency. From tests conducted to date, it appears that the utilization of the polar compound significantly reduces the effect of this boundary layer phenomenon. Tests thus far have demonstrated not only lower energy consumption but also substantially increased energy transfer across the energy transfer surfaces. This improved energy transfer is demonstrated by an increase in the energy transfer coefficient for the system and by shorter system cycle times. As a result of the improved energy transfer, one achieves significantly reduced power consumption in the air conditioning and refrigeration system. Further energy savings can be achieved by taking advantage of the increased energy transfer by reducing the overall size of the air conditioning and refrigeration system for any given load thereby resulting in further energy efficiencies from the use of smaller compressors and the like.

The amount of polar compound which must be added to the air conditioning and refrigeration system is simply that sufficient to achieve the desired increase in energy efficiency. Generally speaking the improved energy efficiency is not achieved immediately upon addition of the polar compound to the system but requires a time delay until the polar compound has become dispersed throughout the system. The length of this delay is to an extent determined by the amount of polar compound added to the system. Accordingly, the amount of polar compound added is determined by the size of the system as well as the rate at which one desires the compound to disperse throughout the system. Typically, the amount of polar compound used is determined by the volume of lubricating oil used in the system. The percentage of polar compound will typically range from about 0.1 to about 50, preferably from 0.5 volume percent up to about 50 volume percent of the lubricating oil. More preferably, the quantity of polar compound will range from about 1% to about 30% of the total lubricant volume. It is preferred that the polar compound be soluble in the lubricant used in the system at the volume percentage of polar compound being utilized. That is, that the solubility of the polar compound exceeds its concentration in the lubricating oil.

In addition to the other physical and chemical properties discussed previously, the polar compound should also be compatible with the lubricating oils.

The polar compound may be introduced into the air conditioning and refrigeration system in any suitable fashion. It may be incorporated into the lubricating oil during the assembly of the system or may be added to the system during operation. If the polar compound is to be added to the system during operation it would be typically injected into the suction side of the compressor. In a particularly preferred embodiment, the polar compound is first dissolved in a carrier compound so as to form a concentrate for easy injection and for better control of the total volume to be added. Generally speaking the carrier component may be any component which is compatible with the air conditioning and refrigeration system under question. Typically, the carrier will comprise the lubricant being utilized to lubricate the system. Still more preferably the carrier is a white oil, a naphthenic mineral oil of high purity. Such white oils are commercially available and include materials such as Texaco Capella WF and its equivalents. The utilization of white oil has the advantage of being compatible with essentially any air conditioning and refrigeration system including both refrigeration and air conditioning. The refrigeration system is the most demanding because of the low temperatures encountered. The carrier compound must remain liquid throughout the entire air conditioning and refrigeration cycle and should not contain substantial quantities of wax which would solidify under operating conditions. The utilization of white oil as a carrier has the advantage of allowing a single composition containing the polar compound to be utilized in essentially any air conditioning and refrigeration system. The concentration of the polar compound in the carrier is not critical and can range from 20 to 80 volume percent and typically is approximately an equivolume mixture.

The carrier system containing an equal volume mixture of polar compound and carrier may be added to an existing oil system at 5–30% rate based on the total quantity of lubricant contained in the system. The rate at which the material is added can be greater or lesser depending upon the concentration of polar compound in the carrier material and the desired final concentration of polar compound in the air conditioning and refrigeration system.

When using halogen containing polar compounds it is preferred to use a stabilizer to prevent free halogen from forming if there is any moisture in the system. The presence of free halide can cause corrosion problems. Suitable stabilizers for sulfonate containing calcium salt of dialkyl aromatic sulfonic acid and nonylated phenylamine derivatives are commercially available. Such stabilizers are commercially sold by a number of companies including King Industries, Inc., Science Road, Norwalk Conn., 06852-0588 which is a blend of sulfonate containing calcium salt of dialkyl aromatic sulfonic acid and nonylated phenylamine derivatives in a hydrocarbon with white mineral oil, wetting agents and an inhibitor. Other commercially available compounds containing halogen inhibitors can be utilized as well. The quantity of stabilizer used is not critical and can range from 0 to 20 volume percent based on polar compound preferably 0.01 to 20 volume percent, more preferably from 0.01 to 10 volume percent. The particular stabilizer selected is not critical so long as it buffers for free sulfonate containing calcium salt of dialkyl aromatic sulfonic acid and nonylated phenylamine derivatives and is compatible with the polar compound, the lubricant and remains dissolved under operating conditions.

It has been determined from testing conducted to date that the present composition and method is effective in improving the efficiency of air conditioning and refrigeration systems both using reciprocating and rotary compressors. Substantial improvements in energy efficiency have been found in all sizes of units ranging from a 1-ton unit up to units nominally rated at 2000 tons. Energy consumption improvements of greater than 10% have been achieved by the use of this invention. Various components can be added to the polar compound to enhance the performance of the lubricant.

I. METAL CONDITIONERS

Metal conditioners can be added. A preferred metal conditioner would be a 3,5-di-tert-butyl-4-hydroxyhydrocinnamic acid, blended with a 7-9 Carbon branched alklyl ester, and a trietary carbon atom united to 3 other carbon atoms, and a nonlyated phenylamine derivative, with a calcium salt of dialklyl aromatic sulfonic acid, and aromatic hydrocarbons of special types with unique unsaturation $C_8H_5O_7SNa$.

II. METAL STABILIZERS

Metal stabilizers comprising a calcium salt of a dialkyl aromatic sulfonic acid, such as methylene-bis-(dibutyldithicarbamate) can be used with the polar compound.

III. ANTIOXIDANTS AND CORROSION INHIBITORS

Antioxidants and corrosion inhibitors with a yellow metal deactivator comprising a calcium salt of dialkyl aromatic sulfonic acid, a 3,5-di-tert-butyl-4-hydroxyhydrocinnamic acid, $C_{7-9}$ branched alklyl ester nonylated phenylamine derivative, a calcium salt of dialkyl aromatic sulfonic acid can be used to enhance the novel composition.

IV. SEAL CONDITIONERS

Seal conditioners can be used in the invention to enhance and provide longevity for seals in the air conditioning system. A preferred seal conditioner is an esterified heptanol acid created di-ester, such as $C_7H_{16}O_2$.

V. TRACER DYES

It is contemplated that tracer dyes can be used within the scope of this invention. A fluorescent dye is considered the best mode when used with the novel composition.

VI. BROAD SPECTRUM BIOCIDES

Biocides stop the growth of fungus and biologicals, such as bacteria in the air conditioning systems. A preferred biocide is a 3-iodopropynylbutylcarbamate. It is contemplated that in the most preferred embodiment, two carbamates can be used simultaneously in the invention.

VII. ACID SCAVENGERS

Acid scavengers can be added to the novel composition to prevent corrosion by controlling the free acids created because of the metal tubing used in the air conditioning system such as calcium salt of dialkyl aromatic sulfonic acid.

VIII. WATER DISPLACEMENT ADDITIVE

This additive is added because the polar compound creates a van der wall force effect in conjunction with the air conditioning tubing. The additive pulls the water away from the wall, and helps prevent forming of sludge on the sides of the tubing, and prevents blockages in the tubing. The preferred water displacement additive is a calcium salt of dialkyl aromatic sulfonic acid.

The advantages of the present invention are to create a lubricant with a long life, controlled miscibility, a high efficiency system, excellent temperature fluidity, and excellent high temperature stability.

PREFERRED FORMULATION

A lubricant additive for an air conditioning system comprising: 10–70 wt % mineral oil, (q.s.) of either a neo-pentol glycol or a dipentol glycol, 8–30 wt % of a tracer dye, 1–10 wt % of methylene-bis-(dibutyldithicarbamate), 1–10 wt % of a calcium salt of dialkyly aromatic sulfonic acid, and 8–30 wt % of a nonylated phenylamine derivative.

The specific most preferred formulation is 64 wt % mineral oil, (q.s.) of the glycol, 16 wt % of a tracer dye, 2 wt % of a methylene-bis-(dibutyldithicarbamate); 2 wt % of a calcium salt of dialkyly aromatic sulfonic acid, and 16 wt % of a nonylated phenylamine derivative.

EXAMPLE

The following test was performed:

| | |
|---|---|
| Equipment Tested: | Carrier Flowtrornc Chiller |
| Tonnage: | Primary Unit 100 Tons |
| | Lag Unit 70 Tons |
| Condition: | 10+ years old with good maintenance |
| Calculation Method: | TIF 220-3 kWh Recorder |
| Results: | 28.5% reduction in kWh usage |
| | 6.25% reduction in decibels |
| | Projected Apnual Savings |
| | in Energy Costs = $11,275. |

Result achieved through better heat transfer and removal of stagnant oil film buildup from the condenser and evaporator coil surface.

Obviously, numerous modifications and variations of the present invention are possible in light of the above teachings. It is therefore to be understood that within the scope of the appended claims, the invention may be practiced otherwise than as specifically described herein.

The oil migration into coils and evaporator units in an a/c and/or refrigeration system was found to be detrimental in heat transference. Oil absorbs energy. The layer of oil on the metal surface acts as an insulative blanket or layer that reduces the designed metal's (copper/aluminum) ability to transfer heat. See table below.

| HEAT CONDUCTIVITY RATE | |
|---|---|
| SUBSTANCE | CONDUCTIVITY FACTOR K |
| Copper | 2680 (675.36 kcal) |
| Aluminum | 1475 (371 .7 kcai) |
| Iron | 350–423 (88.2–106.6 kcal) |
| Steel | 310 (78.12 kcal) |
| Concrete | 5.8 (1.46 kcal) |
| Porcelain | 10 (2.52 kcal) |
| Water | 3.85–5 (.97–1.26 kcal) |
| Wood (with grain) | 2.5 (.63 kcal) |
| Wood (across grain) | 1.0 (.25 kcal) |
| Lubricating Oil | 1.2 (.3 kcal) |
| Asbestos | 0.94 (.24 kcal) |
| Cork | 0.3 (.07 kcal) |
| Rock Wool | 0.26 (.06 kcal) |
| Air | 0.16 (.04 kcal) |

The maximum heat transfer is obtained by using copper, but because of the constant film resistance of the surface of the metals, the heat transfer of a copper evaporator is reduced by 10 to 20% - greater than that of a steel evaporator. Oil film and other chemical buildup on the surface of the metal further reduces the heat transfer rates by as much as 25%–30%.

Evidence shows that this oil film buildup reduces heat transfer. This novel technology of the present invention also reduces the laminar friction between the metal surface and the refrigerant flow rate. It does so by embedding highly polarized molecules into the space lattice of the metal. This action not only removes the oil film buildup from the metal surface, but also dramatically reduces the friction caused between the refrigerant and the metal by acting as an electromagnetic/electrostatic levitation system. Further savings are achieved by not having the compressor overcome the frictional pressures, thus using less energy to pump the refrigerant. In some cases this will allow for more refrigerant to be added into the system because of the added surface area.

Highly polar molecule transfer, which through electromagnetic/electrostatic energy and enable and accelerate heat transfer. This is "electromagnetic/electrostatic heat propagation".

FIG. 1A shows the refrigerant flow before the introduction of our technology where the refrigerant (due to laminar friction) does not touch the metal surface and loses energy. The flow is described as a bullet with a sharp point.

FIG. 1B shows the refrigerant flow with the addition of our technology where the molecules have "removed" the oil film buildup and increased the flow rate of the refrigerant. The bullet shaped curve is now almost flat and the contact point of the refrigerant with the metal surface has dramatically increased, thereby accelerating heat transfer and minimizing energy loss.

This technology replaces the insulative stratum of nonconductive material from the surface of the metal and replaces it with highly conductive polar molecules.

Another beneficial derivative from this technology is the added lubricity and heat transfer of the compressor parts. This acts as two prong benefits: 1) reduction of the heat caused by friction (hence less expansion of the metal parts), less pressures and less wear and tear; and, 2) by embedding polar molecules into the space lattice of the metal surface, reduced wear and tear are expected from cold starts and unexpected lubricant "washout" caused by the refrigerant assimilation with the oil from the compressors moving parts. Treated molecules will stay on the metal and protect it from cold starts. Further benefits are associated through: oxidation inhibitors, seal protectants, metal conditioners, acid scavengers (to reduce acid buildup). Viscosity index improvers, extreme pressure additives, broad spectrum biocides, defoamers and tracer elements.

The following benefits are seen from the unique formulations:

Reduced run time

Reduced wear

Reduced temperatures

Increased lubrication

Increased refrigerant flow rates

Increased heat transfer

Extended equipment life

Longer oil life

Protection against internal corrosion

Increased protection to compressor seals

Quieter operation

Reduced energy draw

Reduced start-up demand

What is claimed is:

1. A method of improving the efficiency of a compressor driven system for removing heat using a compressible liquid refrigerant comprising the step of introducing a lubricant into the compressor of the system, said lubricant is a mixture of a carrier with a polar compound, said polar compound comprising an alpha-olefin with a sulfonate containing a calcium salt of dialkyl aromatic sulfonic acid and nonylated phenylamine derivatives.

2. The method of claim 1, wherein said polar compound is a hydrocarbon containing 6–24 carbon atoms and 1 to 12 halogen atoms with a sulfonate containing calcium salt of dialkyl aromatic sulfonic acid and nonylated phenylamine derivatives.

3. The method of claim 1, wherein said polar compound is present in an amount from 1 to 40 percent by volume of the total volume of lubricant in the compressor.

4. The method of claim 1, wherein said polar compound comprises a sulfonate containing calcium salt of dialkyl aromatic sulfonic acid and nonylated phenylamine derivative which remains liquid throughout the system.

5. An additive for use in lubricants in a system for removing heat using a compressible liquid refrigerant, comprising: a polar compound and a carrier fluid, wherein said polar compound is a sulfonate containing a calcium salt of dialkyl aromatic sulfonic acid and nonylated phenylamine derivatives.

6. The method of claim 1, wherein said liquid mixture has the formula:

between 10 and 70 wt % a mineral oil;

between 8 and 30 wt % of a tracer dye;

between 1 and 10 wt % of a methylene-bis-(dibutyldithicarbamate);

between 1 and 10 wt % of a calcium salt of dialkyly aromatic sulfonic acid;

between 8 and 30 wt % of a nonylated phenylamine derivative.

7. The additive of claim 5, wherein extreme pressure additives are further mixed with the additive.

8. The additive of claim 5, wherein the carrier fluid is naphthenic oil.

9. The additive of claim 5, further comprising a member of the group consisting of: a metal conditioner, a metal stabilizer, a corrosion inhibitor, an antioxident, a seal conditioner, a tracer dye, a biocide, an acid scavenger, a water displacement additive, and combinations thereof.

10. An additive for lubricants comprising a mineral oil, a dipentol glycol, a methylene-bis-(dibutyldithicarbamate), a calcium salt of dialkyly aromatic sulfonic acid and a nonylated phenylamine derivative.

11. The additive of claim 10, further comprising a tracer dye.

12. The additive of claim 5, for use in an air conditioning system.

13. The additive of claim 5, for use in a refrigeration system.

14. An additive for lubricants comprising a mineral oil, a neo-pentol glycol, a methylene-bis-(dibutyldithicarbamate), a calcium salt of dialkyly aromatic sulfonic acid and a nonylated phenylamine derivative.

15. The additive of claim 14, further comprising a tracer dye.

* * * * *